(12) United States Patent
Nishita (10) Patent No.: US 11,644,575 B2
(45) Date of Patent: May 9, 2023

(54) SURVEYING DEVICE AND SURVEYING METHOD

(71) Applicant: TOPCON CORPORATION, Tokyo (JP)

(72) Inventor: Nobuyuki Nishita, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 1163 days.

(21) Appl. No.: 16/238,708

(22) Filed: Jan. 3, 2019

(65) Prior Publication Data

US 2019/0227173 A1  Jul. 25, 2019

(30) Foreign Application Priority Data

Jan. 23, 2018 (JP) .............................. JP2018-008881

(51) Int. Cl.
*G01S 17/42* (2006.01)
*G01C 15/00* (2006.01)
(Continued)

(52) U.S. Cl.
CPC ................ *G01S 17/42* (2013.01); *G01C 3/08* (2013.01); *G01C 15/002* (2013.01); *G01S 7/4804* (2013.01); *G01S 7/4817* (2013.01)

(58) Field of Classification Search
CPC ...... G01C 3/08; G01C 15/002; G01C 15/004; G01C 15/06; G01C 15/008; G01C 15/02;
(Continued)

(56) References Cited

U.S. PATENT DOCUMENTS 8,767,190 B2  7/2014  Hall
11,015,932 B2 *  5/2021  Gächter Toya ...... G01C 15/002
(Continued)

FOREIGN PATENT DOCUMENTS

JP   2008-268004 A   11/2008
JP   2009-229192 A   10/2009
(Continued)

OTHER PUBLICATIONS

Extended Search Report dated Jun. 25, 2019, in connection with European Patent Application No. 18215072.2, 8 pgs.

*Primary Examiner* — Hovhannes Baghdasaryan
(74) *Attorney, Agent, or Firm* — Chiesa, Shahinian & Giantomasi PC (57) ABSTRACT

A technique is provided to more easily measure a distance of a target from a ground surface or a ceiling surface. A surveying device has a laser scanner part and a total station in a unitary manner. The surveying device includes a TS functional part, a laser scanner part, and a distance calculator. The TS functional part positions a reflective prism by using laser light. The laser scanner part performs laser scanning of a ground surface along a vertical plane containing the reflective prism and an optical axis for the laser positioning to obtain a laser scanned point cloud. The distance calculator calculates a distance between the ground surface and the reflective prism on the basis of one or multiple points, which are extracted from the laser scanned point cloud and in proximity to a straight line connecting the reflective prism and a specific plane.

3 Claims, 6 Drawing Sheets

(51) Int. Cl.
*G01C 3/08* (2006.01)
*G01S 7/48* (2006.01)
*G01S 7/481* (2006.01)

(58) Field of Classification Search
CPC ... G01C 15/105; G01S 7/4804; G01S 7/4817; G01S 17/42; G01S 17/89; G01S 7/4812; G01S 17/48; G01S 17/66; G01S 7/4808; G01S 7/4813; G01S 7/4814; G01S 7/497; Y10S 33/21
See application file for complete search history.

(56) References Cited

U.S. PATENT DOCUMENTS

| | | | |
|---|---|---|---|
| 2008/0208417 A1* | 8/2008 | Buehlmann | E01C 19/006 701/50 |
| 2009/0235541 A1 | 9/2009 | Kumagai et al. | |
| 2009/0241358 A1 | 10/2009 | Ohtomo et al. | |
| 2010/0256940 A1 | 10/2010 | Ogawa et al. | |
| 2012/0242830 A1 | 9/2012 | Kumagai et al. | |
| 2012/0272536 A1 | 11/2012 | Nishita | |
| 2012/0272537 A1 | 11/2012 | Nishita | |
| 2015/0293224 A1 | 10/2015 | Eldada et al. | |
| 2016/0327647 A1* | 11/2016 | Herbst | G01C 15/002 |

FOREIGN PATENT DOCUMENTS

| | | |
|---|---|---|
| JP | 2010-151682 A | 7/2010 |
| JP | 2012-202821 A | 10/2012 |
| JP | 5796998 B2 | 10/2015 |
| JP | 5833335 B2 | 12/2015 |

* cited by examiner

SURVEYING DEVICE AND SURVEYING METHOD

CROSS-REFERENCE TO RELATED APPLICATION

This application is based upon and claims benefit of priority from Japanese Patent Application No. 2018-008881, filed Jan. 23, 2018, the entire contents of which are incorporated herein by reference.

TECHNICAL FIELD

The present invention relates to a technique for measuring distance of a target from a ground surface or a ceiling surface.

BACKGROUND OF THE INVENTION

A surveying technique using a total station (TS) and a target having a reflective prism is publicly known. One such technique is disclosed in Japanese Unexamined Patent Application Laid-Open No. 2009-229192, for example.

To determine the height in a vertical direction of the reflective prism from a ground surface, a length of a member that supports the reflective prism may be converted into the height, a point immediately under the reflective prism may be additionally positioned by a TS, or another method may be used. However, these methods tend to be incapable of rapid operation and make the operation complicated.

SUMMARY

In view of these circumstances, an object of the present invention is to provide a technique for more easily measuring distance of a target, which is to be positioned by using laser light, from a ground surface or a ceiling surface.

An aspect of the present invention provides a surveying device having a laser scanner and a total station in a unitary manner. The surveying device includes a positioning unit that positions a target by means of laser positioning. The laser scanner performs laser scanning to a specific plane, along a vertical plane containing the target and an optical axis for the laser positioning, to obtain a laser scanned point cloud of the specific plane. The surveying device also includes a distance calculator that calculates a distance between the specific plane and the target on the basis of one or multiple points in proximity to a straight line connecting the target and the specific plane. The one or multiple points are extracted from the laser scanned point cloud of the specific plane, which is obtained by the laser scanning.

The point in proximity to the straight line may include a point closest to the straight line. The multiple point in proximity to the straight line may include multiple points containing the point closest to the straight line, and may also include points from the point closest to the straight line to an nth point from the point closest to the straight line. The distance calculator of the present invention may calculate the distance on the basis of a straight line that fits to multiple points of the laser scanned point cloud. The distance may be calculated on the basis of a point that is closest to the target and is on the straight line.

In the present invention, the specific plane may be one of a ground surface, a floor surface, and a ceiling surface. The surveying device of the present invention may further include a laser scanning density adjusting unit that adjusts a laser scanning density so that the laser scanning density at a part closest to the target of the specific plane is a specific density or greater.

Another aspect of the present invention provides a surveying method for measuring a distance of a target from a specific plane in surveying by using a surveying device having a laser scanner and a total station in a unitary manner. The target is placed separately from the specific plane. The method includes performing laser positioning of the target using the total station and perform laser scanning of the specific plane, along a vertical plane containing the target and an optical axis for the laser positioning, by the laser scanner to obtain a laser scanned point cloud of the specific plane. The method also includes calculating a distance between the specific plane and the target on the basis of one or multiple points that are in proximity to a straight line connecting the target and the specific plane. The one or multiple points are extracted from the laser scanned point cloud of the specific plane, which is obtained by the laser scanning.

The present invention provides a technique for more easily measuring a distance of a target, which is to be positioned by using laser light, from a ground surface or a ceiling surface.

DETAILED DESCRIPTION

1. First Embodiment (Overview)

Figure 1:
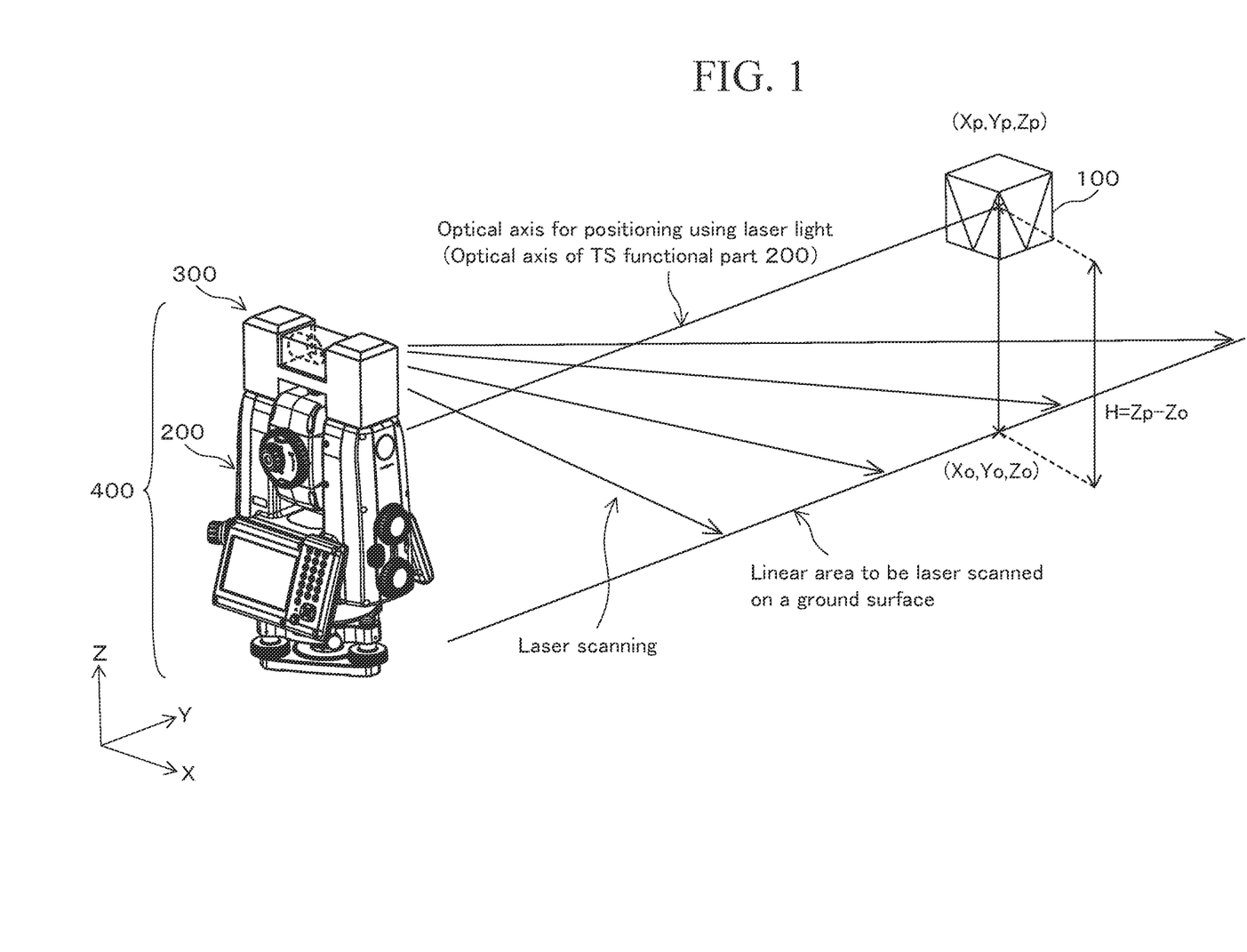
FIG. 1 is a conceptual diagram of an embodiment.
Figure 2:
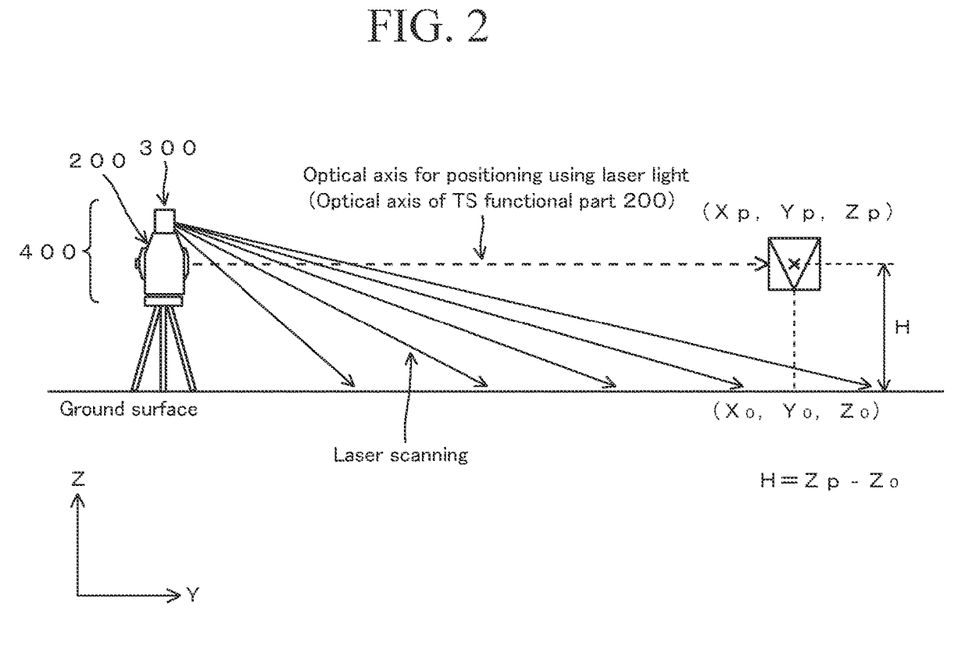
FIG. 2 is a conceptual diagram of the embodiment.

FIG. 1 shows a general view of an embodiment. FIG. 1 is a perspective view, and FIG. 2 is a plane view of the situation shown in FIG. 1 as viewed from an X-axis direction. Note that FIG. 2 shows a surveying device 400 of which the structure is simplified. FIGS. 1 and 2 show the surveying device 400 having a TS functional part 200 and a laser scanner part 300 that are composited. The surveying device 400 is placed at a position of which coordinates in an absolute coordinate system are known, and a reference azimuth of the surveying device 400 is determined. For example, the reference azimuth is a horizontal azimuth using the north direction as reference. The absolute coordinate system is a coordinate system used in a GNSS, for example. The absolute coordinate system specifies a position in terms of longitude, latitude, and elevation above mean sea level. Of course, a local coordinate system can also be used.

The surveying device 400 positions a reflective prism 100 by using a laser positioning function of the TS functional part 200. The laser scanner part 300 performs laser scanning along a vertical plane containing an optical axis of distance measuring light of the TS functional part 200. In this embodiment, the vertical plane is a Y-Z plane shown in FIG. 1. The laser scanning is performed in a direction of an angle of sight, in which the reflective prism 100 is contained, by the laser scanner part 300. As a result, the laser scanning is performed on a linear part on a ground surface, which extends from the surveying device 400 and passes through a point vertically immediately under the reflective prism 100.

In this embodiment, the laser positioning is performed on the reflective prism 100 by the TS functional part 200 to obtain a position (Xp, Yp, Zp) in the absolute coordinate system of the reflective prism 100. The position (Xp, Yp, Zp) is at a center of reflection of the reflective prism 100. In this embodiment, the absolute coordinate system employs a coordinate system that is used in a GNSS, for example.

The laser scanner part 300 performs laser scanning in the direction of the angle of sight, in which the reflective prism 100 is contained. At this time, as shown in FIG. 1, linear laser scanning is performed along positions on the ground surface, on which the optical axis of the distance measuring light from the TS functional part 200 is vertically downwardly projected. Coordinates of a laser scanned point cloud thus obtained are described in the absolute coordinate system.

The linear part that is subjected to the laser scanning contains a point vertically under the surveying device 400 and a point vertically under the reflective prism 100. The laser scanning provides a laser scanned point cloud (Xn, Yn, Zn) composed of n points that are distributed on the linear part. On the basis of the laser scanned point cloud and the coordinates (Xp, Yp, Zp) of the reflective prism, a distance H in the vertical direction from the ground surface to the reflective prism 100, that is, a height H of the reflective prism 100 from the ground surface, is calculated.

For example, two points that have a point (Xp, Yp) therebetween in proximity to the point (Xp, Yp) are extracted from the laser scanned point cloud (Xn, Yn, Zn). Then, an equation of a straight line connecting the two points is derived. Thereafter, a position (X0, Y0, Z0) closest to the point (Xp, Yp) on the straight line is calculated.

Alternatively, a straight line that fits to the laser scanned point cloud (Xn, Yn, Zn) may be obtained, and a point closest to the point (Xp, Yp, Zp) on the straight line may be used as the point (X0, Y0, Z0). Finally, an equation: H=Zp−Z0 is calculated, whereby a height H of a center P of reflection of the reflective prism 100 from the ground surface is obtained.

Surveying Device

The following describes the surveying device 400. The surveying device 400 has the TS functional part 200 and the laser scanner part 300 that are composited. The TS functional part 200 exhibits a function as a total station (TS). Details of the TS are disclosed in Japanese Unexamined Patent Applications Laid-Open Nos. 2009-229192 and 2012-202821, for example.

The laser scanner part 300 performs a process for obtaining a laser scanned point cloud, such as laser scanning. The technique relating to the laser scanner is disclosed in Japanese Unexamined Patent Applications Laid-Open Nos. 2010-151682 and 2008-268004 and in U.S. Pat. No. 8,767,190, for example. In addition, a laser scanner that scans electronically can also be used. Such a laser scanner is disclosed in U.S. Patent Application Publication No. 2015/0293224, for example.

Figure 3:
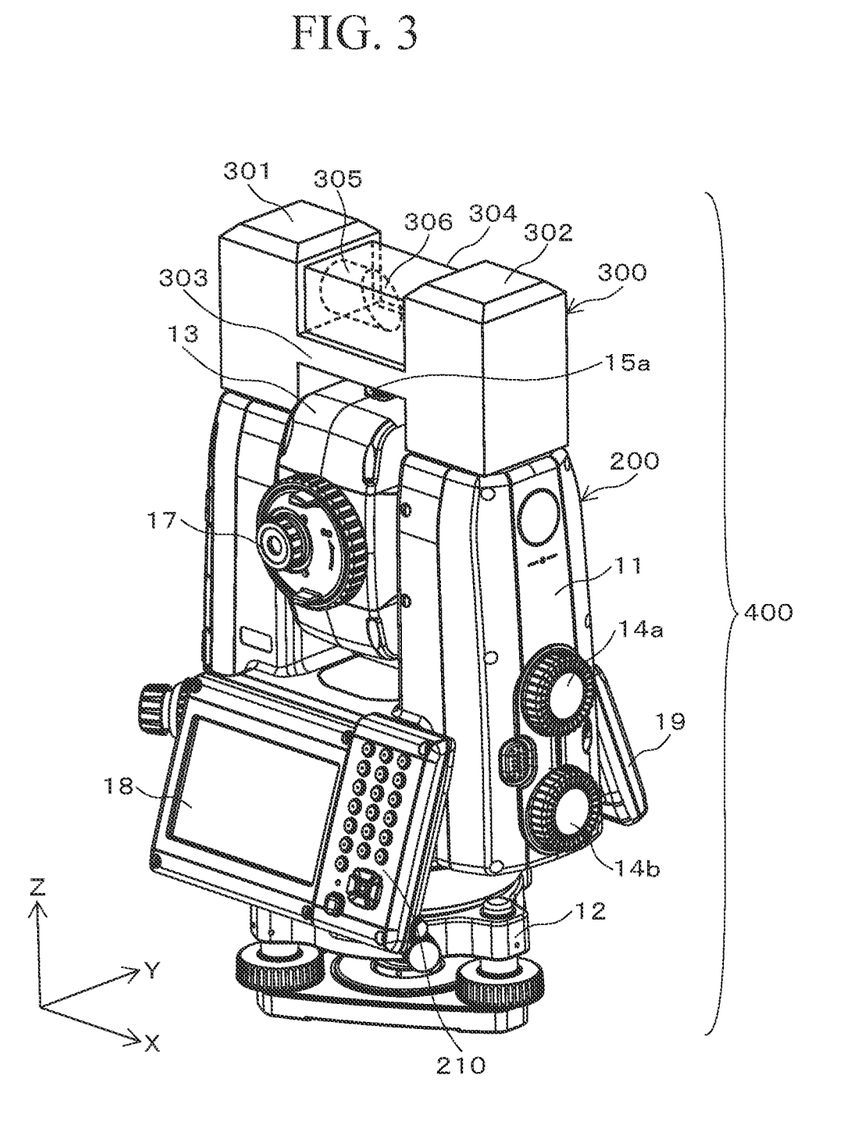
FIG. 3 is a perspective view of a surveying device of the embodiment.
Figure 4:
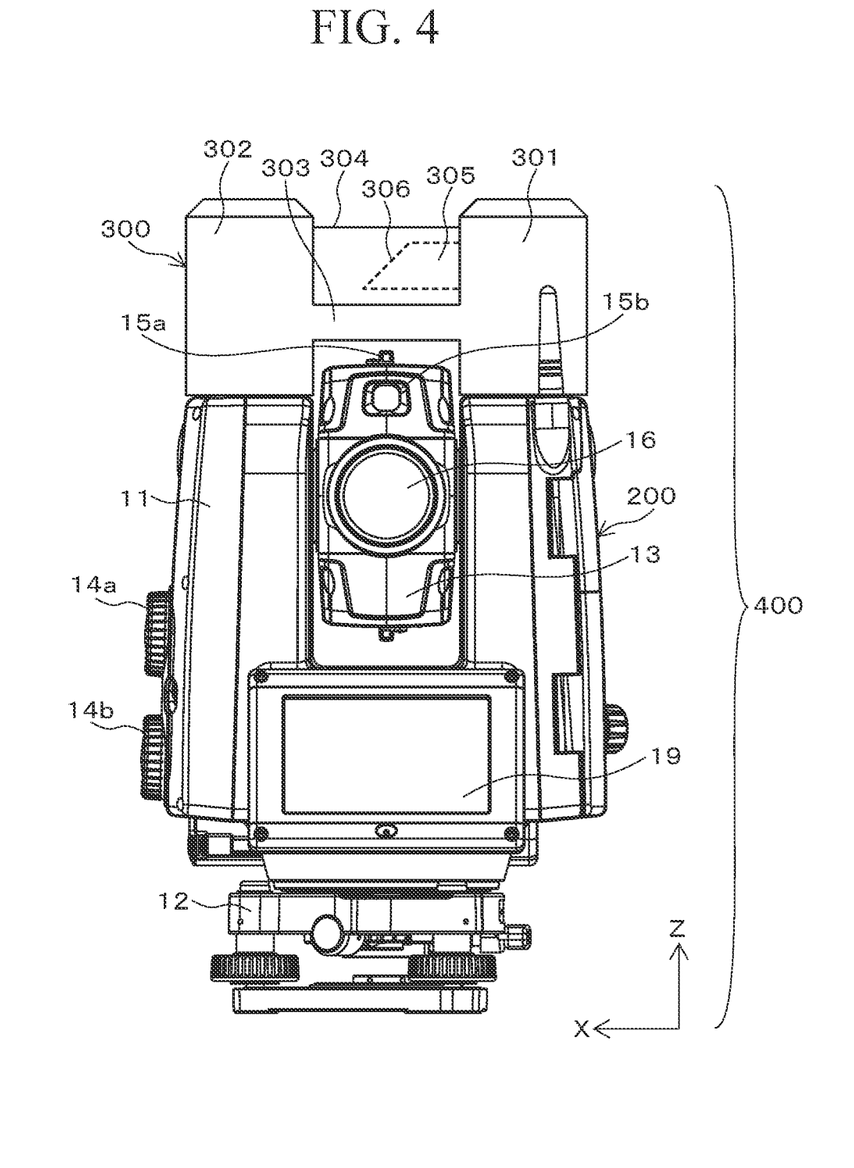
FIG. 4 is a front view of the surveying device of the embodiment.

The following describes the surveying device 400 with reference to FIGS. 3 and 4. The surveying device 400 has a horizontally rotating unit 11. The horizontally rotating unit 11 is held on a base 12 in a horizontally rotatable state. The base 12 may by fixed on a top of a tripod (not shown). The horizontally rotating unit 11 has an approximately U shape and has two extending parts that upwardly extend, and a vertically rotating unit 13 is held between the two extending parts so as to be controllable in the angle of sight, which includes elevation angle and depression angle.

Figure 5:
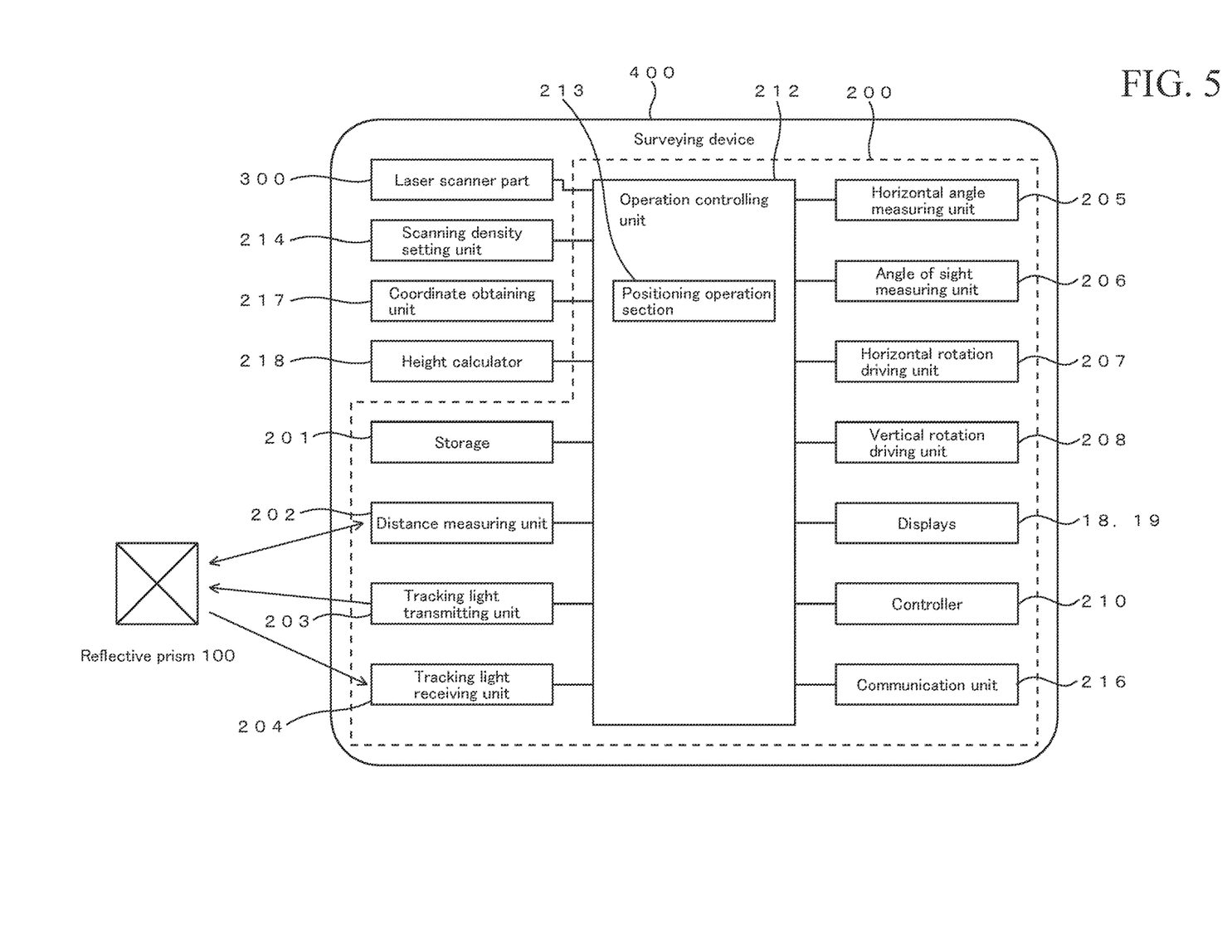
FIG. 5 is a block diagram of the surveying device.

The horizontally rotating unit 11 horizontally rotates relative to the base 12 by electric operation. The vertically rotating unit 13 rotates in a vertical plane by electric operation. The angle in a horizontal plane of the horizontally rotating unit 11 is controlled by a horizontal rotation driving unit 207, which is contained in the horizontally rotating unit 11. The horizontal rotation driving unit 207 is shown in FIG. 5. The angle in the vertical plane of the vertically rotating unit 13 is controlled by a vertical rotation driving unit 208, which is contained in the horizontally rotating unit 11.

The horizontally rotating unit 11 has a horizontal rotation angle controlling dial 14a and an angle of sight controlling dial 14b that are arranged thereon. The horizontal rotation angle controlling dial 14a is operated to adjust a horizontal rotation angle of the horizontally rotating unit 11. The angle of sight controlling dial 14b is operated to adjust the angle of sight, which includes the elevation angle and the depression angle, in the vertical plane, of the vertically rotating unit 13.

The vertically rotating unit 13 has a sighting unit 15a for approximate sighting, arranged on a top thereof. The vertically rotating unit 13 also has an optical sighting unit 15b with a visual field narrower than that of the sighting unit 15a and has a telescope 16 that can be collimated at a higher accuracy. The sighting unit 15b is shown in FIG. 4.

The vertically rotating unit 13 contains an optical system that conducts an image captured by the sighting unit 15b and the telescope 16, to an eyepiece 17. The image that is captured by the sighting unit 15b and the telescope 16 is visually recognized by looking into the eyepiece 17. The image that is captured by the telescope 16 can be imaged by a camera 211 (not shown), which is disposed inside the vertically rotating unit 13.

The telescope 16 also serves as an optical system for distance measuring laser light and for tracking light. The tracking light is used to track and capture an object of which a distance is to be measured, such as a dedicated reflective prism functioning as a target. The optical system is designed so that optical axes of the distance measuring light and the tracking light will coincide with an optical axis of the telescope 16. The structure of this part is the same as that of a commercially available TS.

The horizontally rotating unit 11 has displays 18 and 19 mounted thereto. The display 18 is integrated with a controller 210. The controller 210 has a numeric keypad, a cross operation button, and other operation parts arranged thereon, which are used to perform various operations relating to the surveying device 400 and are used to input data. The displays 18 and 19 display various pieces of information necessary to operate the surveying device 400, surveying data, and other information. These two displays are mounted in order to enable viewing the display from either a front side or a back side without having to rotate the horizontally rotating unit 11.

The horizontally rotating unit 11 has the laser scanner part 300 that is fixed on a top. The laser scanner part 300 has a first column 301 and a second column 302. The first column 301 and the second column 302 are connected by a connecting part 303. The space over the connecting part 303 between the first column 301 and the second column 302 is covered with a protective case 304. The protective case 304 is made of a member that transmits scanning laser light. The protective case 304 houses a columnar rotating part 305 that protrudes from the first column 301 in a horizontal direction.

A tip of the rotating part 305 is obliquely cut off, and this tip has a tilt mirror 306 fixed thereon.

The rotating part 305 is driven to be rotated around an extending direction thereof, which is the horizontal direction, by a motor contained in the first column 301. The first column 301 contains, in addition to the motor, a driving circuit for driving the motor, a control circuit for the driving circuit, a sensor for measuring a rotation angle of the rotating part 305, and a peripheral circuit of the sensor.

The second column 302 contains a light emitting part for emitting laser scanning light, a light receiving part that receives the laser scanning light reflected back from an object, an optical system for the light emitting part and the light receiving part, and a distance calculator that calculates a distance to a laser scanned point. The laser scanner part 300 includes a scanned point position calculator that calculates three-dimensional coordinates of a laser scanned point on the basis of the rotation angle of the rotating part 305, the horizontal rotation angle of the horizontally rotating unit 11, and the distance to the laser scanned point.

The laser scanning light is composed of one beam. The laser scanning light is emitted from the inside of the second column 302 to the tilt mirror 306 and is reflected thereat to exit to the outside via the transparent protective case 304. The laser scanning light is emitted from the light emitting part by means of pulse emission at a repetition frequency of several kHz to several hundreds of kHz. The emitted pulsed light advances in the horizontal direction to the tilt mirror 306 at the tip of the rotating part 305 that is rotating, and this light is reflected thereat at a right angle. Due to rotation around the horizontal axis of the rotating part 305, the laser scanning light is radially and sporadically emitted by means of pulse irradiation, to scan along a vertical plane containing the optical axis of the telescope 16 in the direction of the angle of sight.

The laser scanning is performed to the vertical plane containing the optical axis of the telescope 16 of the TS functional part 200. For example, in the case shown in FIG. 1, assuming that the optical axis of the TS functional part 200 is on a Y-axis, laser scanning light from the laser scanner part 300 exists in a Y-Z plane at a position of X=0 and is emitted along the Y-Z plane.

The laser scanning is performed while the horizontally rotating unit 11 is horizontally rotated, whereby three-dimensional laser scanning is performed to a necessary area.

The scanning light that is reflected back from an object reverses the path of the emitted light and is received by the light receiving part in the second column 302. The laser scanned point, that is, the point that reflects the scanning light, is positioned by referring to light emission timing and light reception timing of the scanning light as well as the angle of the rotating part 305 and the horizontal rotation angle of the horizontally rotating unit 11 at each of these timings. The angle of the rotating part 305 is an angle of sight in terms of an elevation angle or a depression angle. The principle of the positioning is the same as that for the process performed by a positioning operation section 213, which is described later.

Block Diagram of Surveying Device

The configuration of the surveying device 400 in FIG. 1 is described. FIG. 5 is a block diagram showing a configuration of the surveying device 400.

The TS functional part 200 serves for exhibiting a function of a total station. The TS functional part 200 includes a storage 201, a distance measuring unit 202, a tracking light transmitting unit 203, a tracking light receiving unit 204, a horizontal angle measuring unit 205, an angle of sight measuring unit 206, the horizontal rotation driving unit 207, the vertical rotation driving unit 208, the displays 18 and 19, the controller 210, an operation controlling unit 212, and a communication unit 216. The operation controlling unit 212 includes a positioning operation section 213. The surveying device 400 also includes a scanning density setting unit 214, a coordinate obtaining unit 217 for obtaining coordinates of a point immediately under a prism, and a height calculator 218.

The storage 201 is composed of a data storage unit such as a semiconductor memory circuit. The storage 201 stores information such as data necessary to operate the surveying device 400, an operation program, and data obtained as a result of the operation.

The distance measuring unit 202 measures a distance between the surveying device 400 and an object of which a distance is to be measured, which is the reflective prism 100. The origin of the distance measurement is set at a predetermined position such as a position of the light emitting part of the distance measuring unit 202 or an image formation position within the telescope 16.

The distance measuring unit 202 includes a light emitting element that emits distance measuring light, such as a laser diode, and a peripheral circuit of the light emitting element. The distance measuring unit 202 also includes a light receiving element such as a photodiode that receives the distance measuring light reflected back from the object of which the distance is to be measured, a peripheral circuit of the light receiving element, and an operation circuit that calculates a distance to the object on the basis of output from the light receiving element. In this embodiment, the object of which the distance is to be measured is the reflective prism 100.

The distance measuring unit 202 performs positioning as described below. The distance measuring light from the light emitting element is divided into two beams by the optical system using a half mirror and other parts, and one of the beams is emitted to the object to be positioned, and the other is conducted to the reference light path (not shown). The reference light path has a known light path length. The distance measuring light passes through the reference light path and reaches the light receiving element as reference distance measuring light. The light receiving element receives the distance measuring light that has been reflected back from the objected to be positioned and also receives the reference distance measuring light that has passed through the reference light path.

The distance measuring light that has been reflected back from the object to be positioned and the reference distance measuring light that has passed through the reference light path reach the light receiving element at different timings, and thus, output signals as results of detecting them, from the light receiving element, have a phase difference therebetween. This phase difference is used to calculate the distance to the object to be positioned. The distance is calculated by the operation circuit in the distance measuring unit 202.

The tracking light transmitting unit 203 emits tracking light that tracks a target, that is, the object to be positioned. The target is the reflective prism 100 in this embodiment. The tracking light receiving unit 204 receives the tracking light that is reflected back from the target. The tracking light receiving unit 204 includes a CCD image sensor or a CMOS image sensor. A horizontal angle and the angle of sight of the optical axis of the distance measuring unit 202, more exactly, the telescope 16, are controlled so that the tracking light reflected back from the target will be positioned at the center in a visual field of an image captured. The horizontal angle and the angle of sight of the optical axis are respectively controlled by the horizontal rotation driving unit 207 and the vertical rotation driving unit 208 in accordance with control signals generated by the operation controlling unit 212.

The horizontal angle measuring unit 205 measures the horizontal angle of the horizontally rotating unit 11, which is shown in FIG. 3. The horizontal angle is measured by a rotary encoder. Measuring the horizontal angle of the horizontally rotating unit 11 reveals the horizontal rotation angle of the laser scanner part 300. The angle of sight measuring unit 206 measures an angle of sight, in terms of an elevation angle or a depression angle, of the vertically rotating unit 13. The vertical angle is measured by a rotary encoder.

The horizontal rotation driving unit 207 drives to horizontally rotate the horizontally rotating unit 11. The driving is performed by a motor. The horizontal rotation driving unit 207 also drives to horizontally rotate the laser scanner part 300. The vertical rotation driving unit 208 drives to vertically rotate the vertically rotating unit 13, thereby changing the angle of sight. The driving is performed by a motor.

The displays 18 and 19 display information such as various pieces of image information necessary to operate the surveying device 400 and image information of surveying results. The displays 18 and 19 respectively employ a liquid crystal display or an organic EL display. The controller 210 is an operation interface having various kinds of buttons and other parts for operating the surveying device 400.

The operation controlling unit 212 has a function of a computer that includes a CPU, a memory, and various kinds of interfaces, and the operation controlling unit 212 controls the entire operation of the surveying device 400. Some of the operation of the operation controlling unit 212 may be performed by using a dedicated IC, such as an FPGA. This also applies to the functional parts indicated by the reference signs 214, 217, and 218.

The positioning operation section 213 performs an arithmetic operation relating to positioning of the object of which the distance is measured by the distance measuring unit 202, for example, the reflective prism 100. In this embodiment, the positioning is performed to obtain a position of the object relative to the surveying device 400. The arithmetic operation relating to positioning of the object in the positioning operation section 213 is performed as follows. This process performs calculation of a position of the object of which the distance is measured by the distance measuring unit 202, that is, the reflective target 100, on the basis of the distance measurement data of the object obtained by the distance measuring unit 202 and the direction of the optical axis of the distance measuring light, which is obtained by the horizontal angle measuring unit 205 and the angle of sight measuring unit 206. That is, the position of the object relative to the surveying device 400 is calculated in terms of three-dimensional coordinates, from the distance and the direction.

The scanning density setting unit 214 sets a scanning density of laser scanning that is performed by the laser scanner part 300, in accordance with the distance from the surveying device 400 to the reflective prism 100, which is measured by the distance measuring unit 202. In this setting, a scanning speed is adjusted so as not to cause a low scanning density even when the distance is far and so as to provide a scanning density of a predetermined degree or greater. Although a concrete value for the scanning density depends on the final accuracy of the surveying, it is preferable to obtain a value by experiment in advance so as to obtain necessary accuracy.

The coordinate obtaining unit 217 obtains coordinates of a ground surface or a floor surface vertically immediately under the reflective prism 100. For example, two points having a point $(Xp, Yp)$ therebetween in proximity to this point are extracted from the laser scanned point cloud. Then, an equation of a straight line connecting the two points is derived. Next, a position $(X0, Y0, Z0)$ on the straight line, which is closest to the point $(Xp, Yp, Zp)$ is calculated. The coordinates of this position are coordinates of a point on the ground surface, which is vertically immediately under the reflective prism 100.

In another example, the point $(X0, Y0, Z0)$ on the ground surface vertically immediately under the reflective prism 100 may be calculated by the following method. In this case, laser scanned points in an area of $(Xp \pm \Delta X, Yp \pm \Delta Y)$ are extracted. The value of $\Delta$ uses a value that is determined by experiment in advance in accordance with desired accuracy. A position of the geometric center of coordinate values of the obtained multiple laser scanned points is used as the point $(X0, Y0, Z0)$.

In yet another example, a laser scanned point closest to the point $(Xp, Yp)$ may be obtained. In yet another example, multiple laser scanned points surrounding the point $(Xp, Yp)$ from a distance of a threshold value or less may be extracted, and a position of a geometric center of the extracted multiple laser scanned points may be used as the point $(X0, Y0, Z0)$.

Alternatively, a straight line that fits to multiple points of the laser scanned point cloud $(Xn, Yn, Zn)$ may be calculated, and a point closest to the point $(Xp, Yp, Zp)$ on this straight line may be used as the point $(X0, Y0, Z0)$. The height calculator 218 calculates a height H of the reflective prism 100 from the ground surface. The height H is calculated from an equation: $H=Zp-Z0$.

Example of Processing

Figure 6:
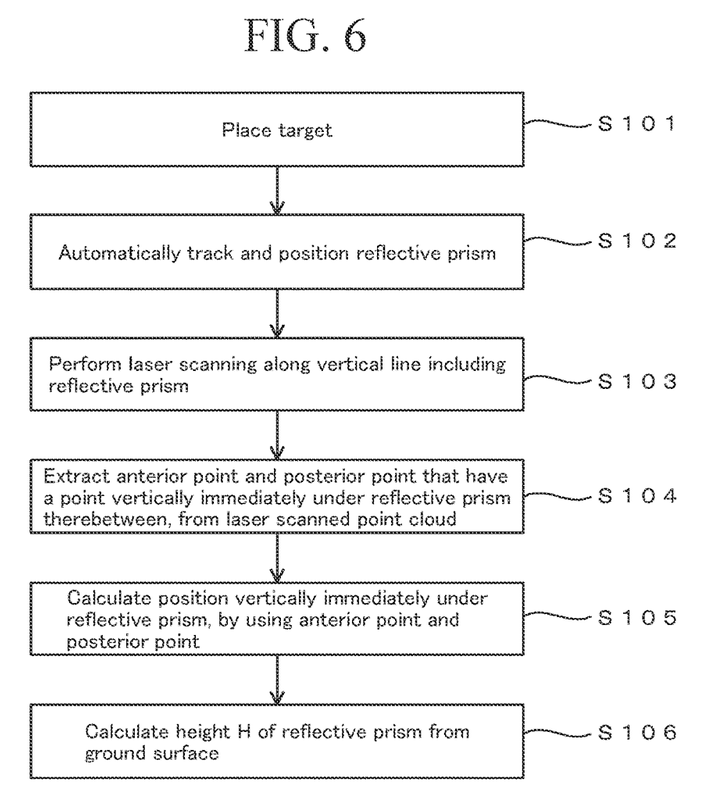
FIG. 6 is a flowchart showing an example of a processing procedure relating to surveying.

The following describes an example of surveying processing using the surveying device 400. FIG. 6 is a flowchart showing a procedure of the surveying processing. An operation program relating to the processing shown in FIG. 6 is stored in the storage 201 shown in FIG. 5 and is executed by the operation controlling unit 212. It is possible to store the operation program in an appropriate storage area or a storage medium. Alternatively or additionally, the operation program may be stored in an external server or a separate unit and may be provided therefrom.

In this embodiment, an example of a processing procedure in the case shown in FIG. 1 is described. First, the reflective prism 100 functioning as a target is placed at a position that is a surveying point (step S101). Then, the reflective prism 100 is automatically tracked, captured, and positioned by using a target automatic tracking function of the TS functional part 200 of the surveying device 400 (step S102). The positioning provides coordinates $(Xp, Yp, Zp)$ of the reflective prism 100.

Next, in a condition of maintaining the horizontal angle that is set in the positioning in step S102, the laser scanner part 300 performs laser scanning along a vertical line containing a center of reflection of the reflective prism 100 (step S103). That is, in the case shown in FIG. 1, the laser scanning is performed along a Y-Z plane containing a center of reflection of the reflective prism 100. The laser scanning results in laser scanning along a line that is generated by projecting the optical axis of the TS functional part 200 to a ground surface vertically immediately under the optical axis. This condition is shown in FIG. 1.

As preparation for the laser scanning, the scanning density of the laser scanning is adjusted on the basis of the distance between the surveying device 400 and the reflective prism 100, which is obtained in step S102. That is, in a case in which the distance to the reflective prism 100 is large, the scanning density is set so that an interval of laser scanned points will be small, thereby causing laser scanning at a predetermined density or greater in proximity to the ground surface immediately under the reflective prism 100.

Next, an anterior point and a posterior point that have a point vertically immediately under the reflective prism 100 therebetween or a point closest to that point therebetween, are extracted from the laser scanned point cloud, which is obtained in step S103 (step S104). Specifically, two adjacent scanned points $(X_n, Y_n)$ and $(X_{n+1}, Y_{n+1})$ that have the point $(X_p, Y_p)$ therebetween or that are presumed to have the point $(X_p, Y_p)$ therebetween, are extracted from the laser scanned point cloud obtained in step S103.

Thereafter, coordinates of a point $(X0, Y0)$ on the ground surface vertically immediately under the reflective prism 100 are calculated on the basis of the two scanned points $(X_n, Y_n)$ and $(X_{n+1}, Y_{n+1})$ obtained in step S104 (step S105). Specifically, an equation of a straight line passing the points $(X_n, Y_n)$ and $(X_{n+1}, Y_{n+1})$ is derived, and a point on the straight line, which is closest to a vertical line of the straight line passing the point $(X_p, Y_p)$ is calculated as the point $(X0, Y0, Z0)$.

Next, an equation: $H = Z_p - Z0$ is calculated, whereby a height H of the reflective prism 100 from the ground surface is calculated (step S106).

2. Second Embodiment

Figure 7:
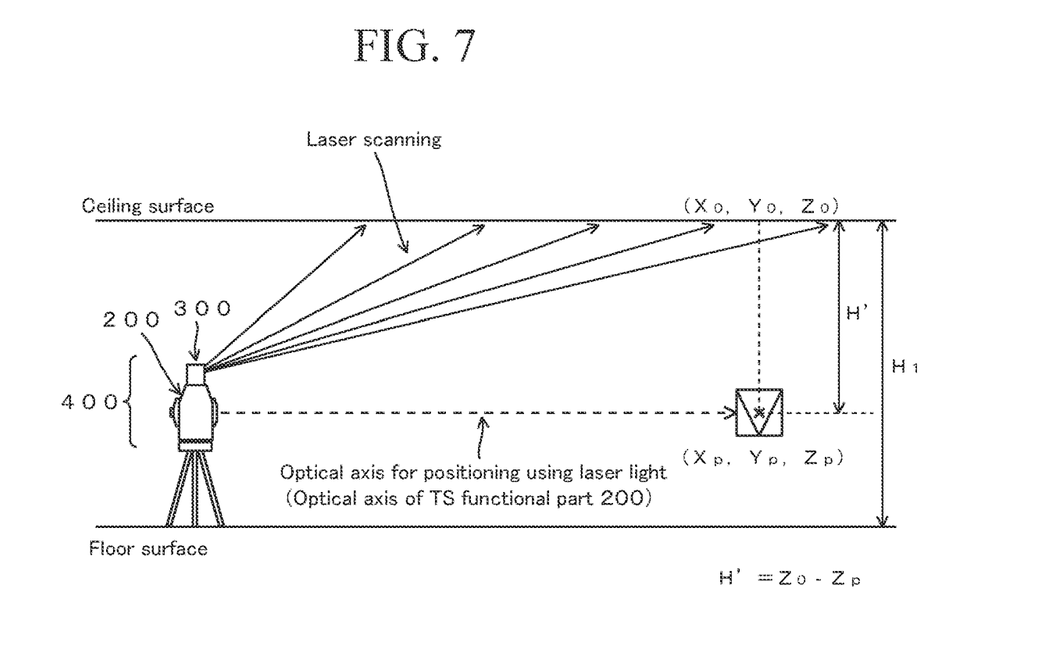
FIG. 7 is a conceptual diagram of another embodiment.

FIG. 7 shows a case of obtaining a distance H' between the reflective prism 100 and a ceiling surface. In this case, laser scanning is performed along a vertical plane containing the reflective prism 100, and the distance H' is calculated by the same principle as in the case shown in FIG. 1. In the condition in which a height of the reflective prism 100 from a floor surface is determined, a distance H1 from the floor surface to the ceiling surface is obtained.

3. Third Embodiment

Laser scanning may be performed to the floor surface and the ceiling surface, along the vertical plane containing the reflective prism 100. This enables an operation of placing the reflective prism 100 at a predetermined height from the floor surface. For example, in a tunnel having a height of 5 meters from a floor surface to a ceiling surface, it is assumed that a position 3 meters above the floor surface is to be identified.

In this case, the reflective prism 100 is placed at an appropriate height first, and a height H of the reflective prism 100 from the floor surface is calculated by the principle shown in FIG. 1. The position of the reflective prism 100 is adjusted upwardly or downwardly so that the height H will be 3 meters to identify the position 3 meters above the floor surface. With use of a similar principle, a position at a predetermined distance under the ceiling surface can also be identified.

4. Fourth Embodiment

The reflective prism 100 may be incorporated with a device that emits light of a laser point to a point vertically immediately under the reflective prism 100. In this case, the point vertically immediately under the reflective prism 100 is indicated by the light of the laser point at the same time as a position of the reflective prism 100 and a height of the reflective prism 100 from a ground surface or a floor surface are measured. Thus, the point vertically immediately under the reflective prism 100 is easy to recognize visually. With use of a similar principle, light of a laser point may be emitted to a ceiling surface.

The technique for vertically downwardly emitting light of a laser point is disclosed in Japanese Patents Nos. 5833335 and 5796998, for example.

The present invention can be used in a surveying technique.

What is claimed is:

1. A surveying device comprising:
a horizontally rotating unit configured to rotate horizontally;
a total station (TS) functional part including a vertically rotating unit and configured to function as a total station, the vertically rotating unit fixed to the horizontally rotating unit in a vertically rotatable manner and including an optical system of distance measuring laser light;
a laser scanner part fixed to the horizontally rotating unit and configured to perform laser scanning along a vertical plane containing an optical axis of the distance measuring laser light; and
a processor or circuitry configured to:
calculate a three-dimensional coordinate position of a target reflective prism on a basis of a measured value that is obtained by using the distance measuring laser light of the TS functional part;
calculate a height "H" of the target reflective prism from a ground surface or a floor surface, on a basis of the calculated three-dimensional coordinate position of the target reflective prism and on a basis of a linear laser scanned point cloud that is obtained in laser scanning along the vertical plane by the laser scanner part;
obtain coordinates $(X0, Y0, Z0)$ of a point on the ground surface or the floor surface vertically immediately under the target reflective prism,
in a case in which the calculated three-dimensional coordinate position of the target reflective prism is $(X_p, Y_p, Z_p)$:
extract two points that have a point $(X_p, Y_p)$ therebetween from the laser scanned point cloud;
calculate an equation of a straight line connecting the two points;
calculate a point closest to the point $(X_p, Y_p)$ on the straight line, as the position $(X0, Y0, Z0)$; and
calculate of the height "H" from an equation $H = Z_p - Z0$.

2. A surveying device comprising:
a horizontally rotating unit configured to rotate horizontally;
a total station (TS) functional part including a vertically rotating unit and configured to function as a total station, the vertically rotating unit fixed to the horizontally rotating unit in a vertically rotatable manner and including an optical system of distance measuring laser light;
a laser scanner part fixed to the horizontally rotating unit and configured to perform laser scanning along a vertical plane containing an optical axis of the distance measuring laser light; and
a processor or circuitry configured to:

calculate a three-dimensional coordinate position of a target reflective prism on a basis of a measured value that is obtained by using the distance measuring laser light of the TS functional part;

calculate a height "H" of the target reflective prism from a ground surface or a floor surface, on a basis of the calculated three-dimensional coordinate position of the target reflective prism and on a basis of a linear laser scanned point cloud that is obtained in laser scanning along the vertical plane by the laser scanner part; and obtain coordinates (X0, Y0, Z0) of a point on the ground surface or the floor surface vertically immediately under the target reflective prism, in a case in which the calculated three-dimensional coordinate position of the target reflective prism is (Xp, Yp, Zp):

extract multiple laser scanned points in an area surrounding a point (Xp±ΔX, Yp±ΔY), from the laser scanned point cloud;

calculate a position of a geometric center of the extracted multiple laser scanned points as the position (X0, Y0, Z0); and calculate the height "H" from an equation H=Zp−Z0.

3. A surveying device comprising:

a horizontally rotating unit configured to rotate horizontally;

a total station (TS) functional part including a vertically rotating unit and configured to function as a total station, the vertically rotating unit fixed to the horizontally rotating unit in a vertically rotatable manner and including an optical system of distance measuring laser light;

a laser scanner part fixed to the horizontally rotating unit and configured to perform laser scanning along a vertical plane containing an optical axis of the distance measuring laser light; and a processor or circuitry configured to:

calculate a three-dimensional coordinate position of a target reflective prism on a basis of a measured value that is obtained by using the distance measuring laser light of the TS functional part;

calculate a height "H" of the target reflective prism from a ground surface or a floor surface, on a basis of the calculated three-dimensional coordinate position of the target reflective prism and on a basis of a linear laser scanned point cloud that is obtained in laser scanning along the vertical plane by the laser scanner part; and obtain coordinates (X0, Y0, Z0) of a point on the ground surface or the floor surface vertically immediately under the target reflective prism, in a case in which the calculated three-dimensional coordinate position of the target reflective prism is (Xp, Yp, Zp):

extract multiple laser scanned points from the laser scanned point cloud, the multiple laser scanned points surrounding a point (Xp, Yp) while being separated from the point (Xp, Yp) by distances of a threshold or shorter;

calculate a position of a geometric center of the extracted multiple laser scanned points as the position (X0, Y0, Z0); and calculate the height "H" from an equation H=Zp−Z0.

* * * * *